United States Patent [19]

Gilling et al.

[11] Patent Number: 5,495,251
[45] Date of Patent: Feb. 27, 1996

[54] METHOD OF AND APPARATUS FOR CRUISE CONTROL

[75] Inventors: Simon P. Gilling, Milton Keynes; Douglas Ponsford, Coventry; Reza Shokoufandeh, Coventry, all of Great Britain

[73] Assignee: Lucas Industries Public Limited Company, Solihull, England

[21] Appl. No.: 197,761

[22] Filed: Feb. 16, 1994

[30] Foreign Application Priority Data

Feb. 20, 1993 [GB] United Kingdom .................. 9303434

[51] Int. Cl.⁶ ...................................... B60K 31/00
[52] U.S. Cl. ................. 342/70; 364/426.04; 364/431.07; 180/167; 180/170
[58] Field of Search ........................ 342/70, 71; 180/167, 180/170, 169; 364/426.04, 431.07, 426.01; 123/352; 340/903, 904

[56] References Cited

U.S. PATENT DOCUMENTS

| | | | |
|---|---|---|---|
| 4,519,469 | 5/1985 | Hayashi et al. | 342/70 |
| 4,621,705 | 11/1986 | Etoh | 180/170 |
| 5,014,200 | 5/1991 | Chundrlik et al. | 180/167 |
| 5,166,881 | 11/1992 | Akasu | 364/426.04 |
| 5,173,859 | 12/1992 | Deering | 364/426.04 |

*Primary Examiner*—Ian J. Lobo
*Attorney, Agent, or Firm*—Jacobson, Price, Holman & Stern

[57] ABSTRACT

A vehicle cruise controller is provided which monitors the range to and relative speed of a target vehicle ahead of the vehicle being controlled by the cruise controller. A radar provides measurements of range and relative speed. The range measurement is compared by a subtracter with a desired range which is a function of vehicle speed, so as to form a distance error. The relative speed signal represents a speed error. An acceleration demand is formed as a function, for example, a weighted sum, of the distance and speed errors. More significance is given to the distance error when the target is relatively close. This is achieved by varying the gain of a multiplier. The acceleration demand may be supplied to vehicle brake and drive systems, but preferably the acceleration demand is compared with actual vehicle acceleration to provide the advantages of closed loop control.

17 Claims, 2 Drawing Sheets

METHOD OF AND APPARATUS FOR CRUISE CONTROL

The present invention relates to a method of and an apparatus for cruise control.

Known cruise controllers for vehicles allow a driver to set a target vehicle speed. The cruise controller then acts to maintain the vehicle speed at the target speed. Such a controller does not monitor the distance to or speed of vehicles ahead of the vehicle under cruise control. Thus, the driver has to intervene if the vehicle under cruise control approaches another vehicle too closely for the target speed, for instance so as to ensure that a safe braking distance remains between the vehicles. Even if the other vehicle is under cruise control and the driver of the other vehicle has set the same nominal target vehicle speed, variations and tolerances between the vehicles and the cruise controllers are such that the actual vehicle speeds when under cruise control will generally be slightly different. Again, if the following vehicle approaches the lead vehicle too closely, the driver has to intervene, for instance by switching off the cruise controller or by applying the vehicle brake, which normally disengages at least temporarily the cruise controller.

According to a first aspect of the invention, there is provided a cruise control apparatus for a vehicle, comprising distance error determining means for determining a distance error as the difference between a desired distance between a target and the vehicle and the actual distance between the target and the vehicle, speed error determining means for determining a speed error as the difference between the speed of the target and the speed of the vehicle, and acceleration demand producing means for producing a vehicle acceleration demand as a function of the distance error and of the speed error.

Preferably the acceleration demand is calculated as a sum of the product of the distance error and a first gain parameter and the product of the speed error and a second gain parameter. The second gain parameter may be a constant, for instance unity. Thus the acceleration demand is calculated as a weighted sum of the speed error and the distance error.

The target is preferably a further vehicle ahead of the vehicle having the cruise control apparatus. The distance and speed errors may be determined by any suitable means, for instance in the form of an electromagnetic or ultra-sonic radar system for providing a direct measurement of the distance. The speed error may be obtained by differentiating the output of the radar system with respect to time. Alternatively, the speed error may be provided automatically by a suitable radar system, for instance of the döppler type.

The apparatus may further comprise desired distance determining means for determining the desired distance as a function of the vehicle speed. For instance, the desired distance may be a linear function of the vehicle speed.

The apparatus may further comprise gain setting means for setting at least one of the first and second gain parameters such that the quotient of the first gain parameter divided by the second gain parameter is a function of the distance and/or distance error. The gain setting means may set the quotient to a first value for a first distance error or a first actual distance and to a second value less than the first value for a second distance error or a second actual distance greater than the first distance error or the first actual distance. The first and second values may comprise maximum and minimum values, for instance 7 and 1, respectively, and the gain setting means may set the quotient as a monotonically decreasing, preferably substantially continuous, function of the distance error between the first and second distance errors or of the actual distance between the first and second actual distances. The gain setting means may be arranged to halve the value of the quotient when the distance error is greater than a first predetermined distance error which is greater than zero and the speed error is greater than a first predetermined speed error which is greater than zero.

The apparatus may further comprise acceleration error producing means for producing an acceleration error as the difference between the acceleration demand and the actual vehicle acceleration.

The apparatus may further comprise gating means for supplying the acceleration error to a vehicle drive system when the acceleration demand is greater than a first threshold which is greater than or equal to zero, and for supplying the acceleration error to a vehicle brake system when the acceleration demand is less than a second threshold which is less than or equal to zero. Inhibiting means may be provided for inhibiting the supply of the acceleration error to the vehicle brake system when the acceleration demand is less than the second threshold, the distance error is less than a second predetermined distance error which is less than zero, and the speed error is less than a second predetermined speed error which is less than zero.

For a vehicle driven by an internal combustion engine having a throttle controlled in cruise mode by an integrating controller, the apparatus may comprise further gain setting means for multiplying the acceleration error by a third gain parameter which is a function of the vehicle speed. The third gain parameter may have a constant value below a predetermined vehicle speed and a value which increases monotonically, for instance linearly, with vehicle speed above the predetermined vehicle speed. The apparatus may further comprise limiting means for limiting the acceleration demand or error to less than a first positive demand threshold and greater than a negative demand threshold. The apparatus may further comprise disabling means for disabling the limiter when the acceleration demand is greater than the first positive demand threshold and the vehicle acceleration is less than a second positive demand threshold which is less than the first positive demand threshold. For instance, the first and second positive demand thresholds may be 15% g and 10% g, respectively, and the negative demand threshold may be −30% g, where g is acceleration due to gravity.

According to a second aspect of the invention, there is provided a method of cruise control for a vehicle, comprising determining a distance error as the difference between a desired distance between a target and the vehicle and the actual distance between the target and the vehicle, determining a speed error as the difference between the speed of the target and the speed of the vehicle, and controlling the vehicle in accordance with a vehicle acceleration demand formed as a function of the distance error and the speed error.

Preferably the vehicle acceleration demand is formed as the sum of the product of the distance error and a first gain parameter and the product of the speed error and a second gain parameter.

It is thus possible to provide cruise control in which a vehicle is capable of matching its speed to a further vehicle ahead of it while maintaining a desired distance from the further vehicle. Thus, when in cruise control mode, driver intervention can be reduced or substantially eliminated irrespective of the speed of the further vehicle.

The present invention will be further described, by way of example, with reference to the accompanying drawings, in which.

Figure 1:
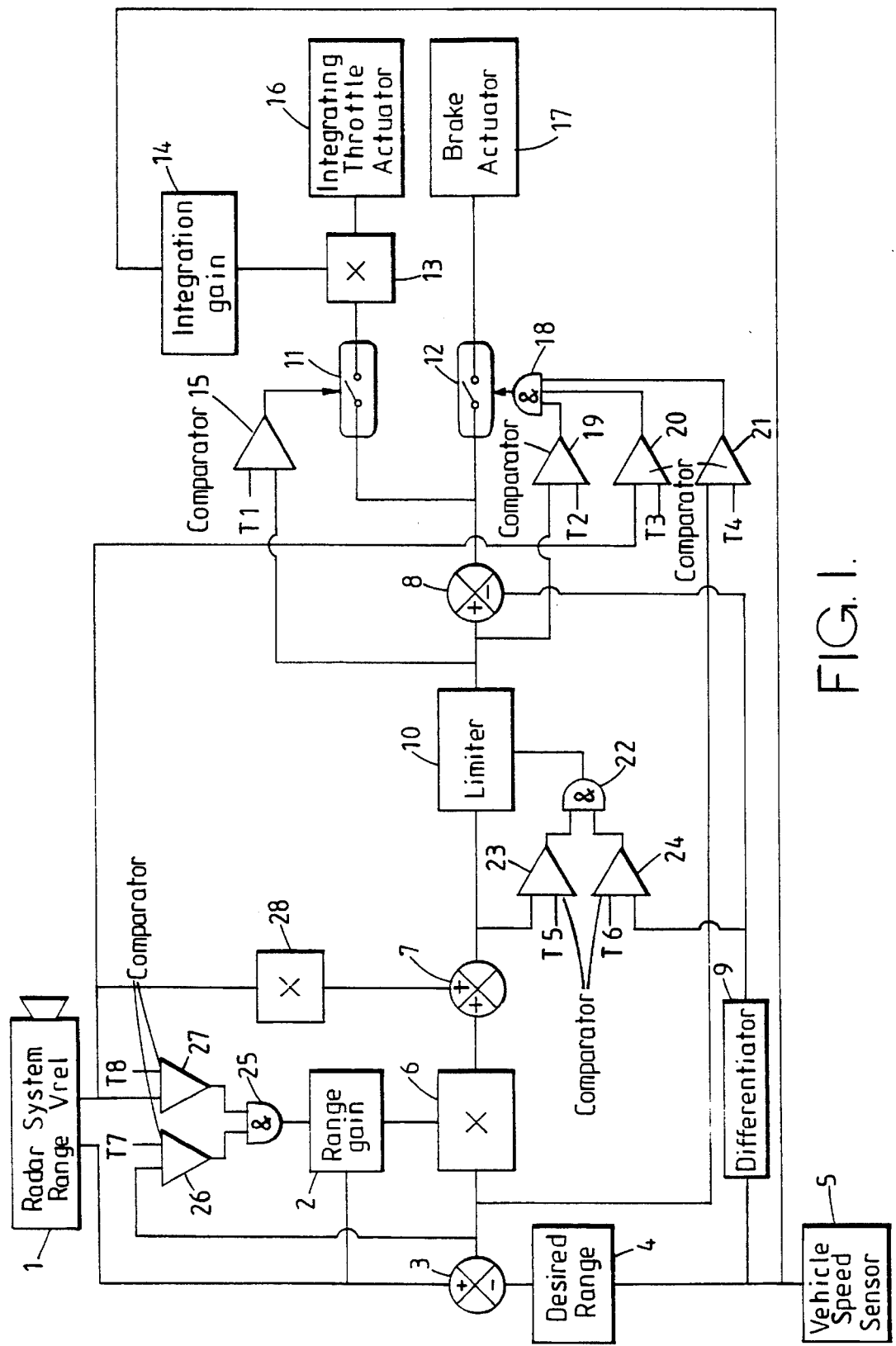
FIG. 1 is a schematic diagram of a cruise control apparatus constituting an embodiment of the present invention.

The cruise control apparatus shown in FIG. 1 is provided in a vehicle driven by an internal combustion engine and comprises a radar system 1 which is mounted at the front of the vehicle and faces forwards so as to detect a further vehicle ahead of the vehicle. The radar system 1 provides a range output corresponding to the distance between the vehicle and the further vehicle and a relative speed output Vrel which corresponds to the difference in speeds of the vehicle and the further vehicle.

The range output of the radar system 1 is supplied to the adding input of a subtracter 3. The subtracting input of the subtracter 3 is connected to the output of a desired range setting circuit 4 whose input is connected to a vehicle speed sensor 5 for determining the speed of the vehicle. The sensor 5 may comprise any suitable sensor, such as an optical speed over ground sensor or a system for determining vehicle speed based on measurements of wheel speeds.

The output of the subtracter 3 is supplied to a first input of a multiplier 6 whose second input is connected to the output of a range gain setting circuit 2 having an input connected to the range output of the radar system 1. The output of the multiplier 6 is connected to a first input of an adder 7 whose second input is connected to the radar system 1 via a multiplier 28 so as to receive the relative speed signal. The multiplier is arranged to scale the relative speed signal prior to use by the adder 7. The multiplier 28 may be omitted if a gain of unity is applied to the relative speed signal. The output of the adder 7 is connected to the input of a limiter 10 for limiting the maximum positive and negative values of the acceleration demand signal. For instance, the maximum positive acceleration may be limited so as to be less than or equal to 15% g and the maximum deceleration may be limited so as to be less than or equal to 30% g, where g is acceleration due to gravity. The limited acceleration demand signal from the limiter 10 is supplied to the adding input of a subtracter 8 whose subtracting input is connected to the output of a differentiator 9. The input of the differentiator 9 is connected to the vehicle speed sensor so that the differentiator 9 provides a signal corresponding to the vehicle acceleration.

The output of the subtracter 8, which represents an acceleration error signal, is supplied to a gating arrangement comprising electronic switches 11 and 12. The switch 11 selectively connects the output of the subtracter 8 to a first input of a multiplier 13 whose second input is connected to the output of an integration gain setting circuit 14. The input of the circuit 14 is connected to the output of the vehicle speed sensor 5. The switch 11 is controlled by a comparator 15 having a first input connected to the output of the limiter 10 and a second input connected to receive a first threshold T1 which corresponds to an acceleration error which is normally greater than zero. The output of the multiplier 13 is connected to the input of a throttle actuator 16 of the internal combustion engine of the vehicle. The throttle actuator is of the type which controls the engine throttle in accordance with the integral with respect to time of the signal supplied thereto.

The switch 12 selectively connects the output of the subtracter 8 to a brake actuator 17 of the vehicle. The switch 12 has a control input connected to the output of an AND gate 18 having three inputs. The first input is connected to the output of a comparator 19 having a first input connected to the output of the limiter 10 and a second input connected to receive a threshold T2 corresponding to an acceleration which is less than zero. The second input of the gate 18 is connected to a comparator 20 having a first input connected to the radar system 1 so as to receive the relative speed signal and a second input connected to receive a threshold T3 corresponding to a relative speed or speed error which is less than zero. The third input of the gate 18 is connected to the output of a comparator 21 which has a first input connected to the output of the subtracter 3 so as to receive a range error signal and a second input connected to receive a threshold T4 corresponding to a range or distance error which is less than zero.

The limiter 10 has a disabling input for preventing the limiter from limiting the acceleration demand signal to the predetermined maximum limit value. The disabling input is connected to the output of an AND gate 22 which has two inputs. The first input of the gate 22 is connected to the output of a comparator 23 having a first input connected to the output of the adder 7 and a second input for receiving a threshold T5 corresponding to an acceleration demand which is equal to the maximum or upper limit value of the limiter. The second input of the gate 22 is connected to the output of a comparator 24 having a first input connected to the output of the differentiator 9 and a second input for receiving a threshold T6 corresponding to an acceleration between zero and the upper limit value. In the case where the upper limit value of the limiter 10 is 15% g, the threshold T6 may correspond to 10% g.

The range gain setting circuit 2 has an input connected to the output of an AND gate 25 having two inputs. The first input of the gate 25 is connected to the output of a comparator 26 having a first input connected to the output of the subtracter 3 and a second input for receiving a threshold T7 corresponding to a predetermined distance error which is greater than zero. The second input of the gate 25 is connected to the output of a comparator 27 having a first input connected to receive the relative velocity signal from the radar system 1 and a second input for receiving a threshold T8 which corresponds to a predetermined speed error which is greater than zero.

When cruise control is selected, the cruise control apparatus shown in FIG. 1 controls the engine throttle and vehicle brake system automatically unless and until cruise control is disabled, for instance by the driver switching off cruise control or operating the accelerator or brake controls of the vehicle. The radar system 1 supplies range and relative speed signals corresponding to the distance between the vehicle and the closest other vehicle ahead of it and the difference between the speeds of the two vehicles. The range is supplied to the subtracter 3. The subtracter 3 forms a range error signal by subtracting the actual range from a desired range generated by the circuit 4. The circuit 4 sets the desired range as a function of the vehicle speed measured by the sensor 5. The circuit 4 may comprise a look-up table stored in a read only memory or a calculating circuit for calculating values of the function based on the vehicle speed. For instance, the desired range S may be determined in accordance with the following function:

$$S = (0.23 \times V) + 7$$

where the desired range S is given in metres and V is the vehicle speed in kilometres per hour.

In the absence of the constant 7 metres, the vehicle would be arranged to follow the further vehicle with a time separation of 0.83 seconds. However, for increased flexibility, the desired range setting circuit 4 may be controllable by the driver so as to select any time separation, and hence desired range, within predetermined limits, for instance of 0.8 and 2.5 seconds. The constant 7 metres ensures that, for relatively low speeds, the vehicle maintains a minimum spacing from the further vehicle ahead of it so that, for instance, if the further vehicle were to stop, the vehicle in cruise control would stop with a desired range sufficient to prevent a collision.

Figure 2:
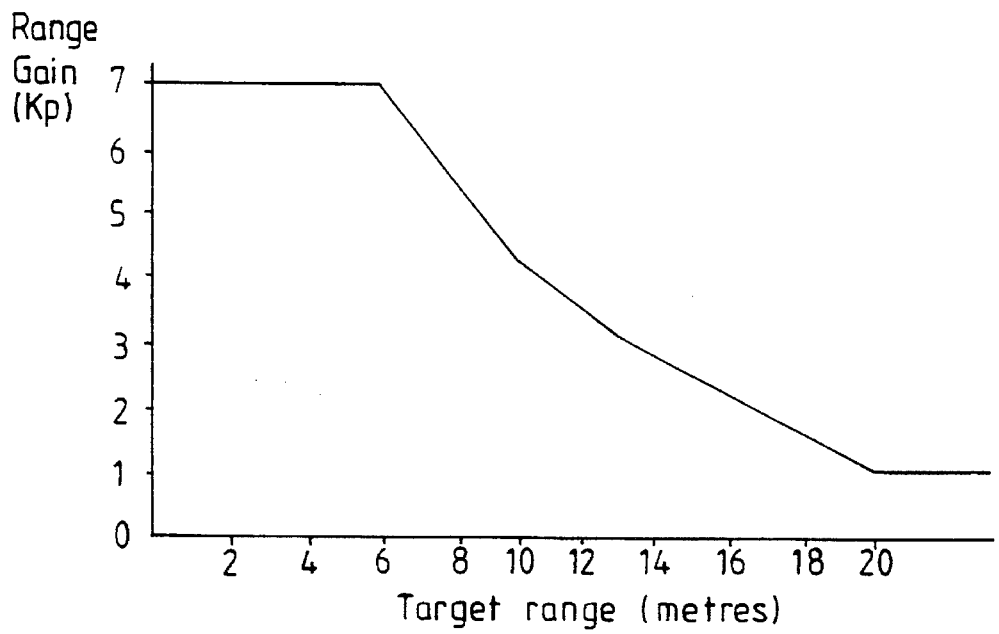
FIG. 2 is a graph of range gain versus distance to a target.

The range or distance error from the subtracter 3 is multiplied in the multiplier 6 by a range gain which is set in the circuit 2. The circuit 2 may comprise a look-up table stored in read only memory or means for calculating the range gain primarily as a function of the actual range or distance between the two vehicles. The function of range gain against range is illustrated in FIG. 2. The range gain has a maximum value of 7 for target ranges below 6 metres and a minimum value of 1 for target ranges above 20 metres. Between 6 and 20 metres, the range gain decreases monotonically and continuously or substantially continuously, for instance in the case of a digital system.

The output of the multiplier 6 is added to the speed error signal by the adder 7, that is, in this embodiment, the multiplier 28 has a gain of one. Thus, for target ranges of 20 metres and above, the relatively low range gain of 1 is applied to the distance error and the speed error therefore has more influence on cruise control. Even with the relatively low range gain, if the distance error persists for a substantial time, the integral action of the throttle actuator 16 corrects the distance error smoothly.

For relatively small desired ranges, a quicker response to distance error is required and the gain is progressively increased for desired ranges below 20 metres until it reaches the maximum value of 7 at 6 metres and below. For such small desired ranges, any distance error represents a relatively large proportion of the desired range and a quick response is required in order to remove the distance error and, for instance, prevent the vehicle from approaching too closely the further vehicle ahead of it.

Thus, for relatively small desired ranges, the distance error has substantially more influence than the speed error in controlling the vehicle.

When the output of the gate 25 is active, a signal is supplied to the second input of the circuit 2 which causes the circuit to halve the range gain set in accordance with the function illustrated in FIG. 2. The comparator 26 detects when the distance error is relatively great so that the vehicle under cruise control is relatively far behind the vehicle ahead of it. The comparator 27 determines when the speed error is such that the vehicle under cruise control is closing on the vehicle ahead of it. Thus, when the controlled vehicle is closing but is relatively far behind the lead vehicle, the range gain is halved so as to prevent overshoot.

The output of the adder 7 represents an acceleration demand signal which itself could be used to control acceleration of a vehicle by being suitably processed and applied, for instance, to the throttle actuator 16 and the brake actuator 17. However, in order to provide closed loop control of acceleration, the acceleration demand is compared with the actual vehicle acceleration in the subtracter 8 to form an acceleration error. The acceleration demand from the adder 7 is limited by the limiter 10 to a maximum value of +15% g and a minimum value of −30% g. These maximum values of acceleration and deceleration have been found to be advantageous for the comfort of passengers in the vehicle. However, a problem may occur when a lead vehicle accelerates quickly, or is moving up a relatively steep gradient (or a combination of such adverse situations). In such combinations, the vehicle under cruise control may not be able to accelerate quickly enough to stay within range of the lead vehicle. In order to avoid or reduce the likelihood of such a problem, the limiter 10 is arranged to be disabled in respect of the upper limit value of +15% g if the acceleration demand from the adder 7 is greater than +15% g as determined by the comparator 23 but the actual vehicle acceleration calculated by the differentiator 9 is less than +10% g as determined by the comparator 24. In these circumstances, which correspond to adverse conditions of the type described hereinbefore, the limiter 10 allows a larger acceleration demand to be used to control drive of the vehicle. The integrating action of the throttle actuator 16 is such that the throttle opens at a greater rate so as to improve acceleration until the vehicle acceleration exceeds +10% g as detected by the comparator 24, at which point the limiter 10 then reverts to normal operation and limits the maximum value of the acceleration demand to +15% g.

Where the cruise control apparatus is fitted to a vehicle having an anti-lock brake system, then braking control provided by the cruise control apparatus will be overridden if the anti-lock braking system detects excessive wheel slip during braking. Similarly, if the vehicle is provided with automatic traction control, then control of the engine throttle by the cruise control apparatus will be overridden if the traction control system detects excessive wheel spin.

The gating arrangement comprising the switches 11 and 12 the comparator 15 and the comparator 19 via the gate 18 ensure that positive acceleration demands control the engine throttle whereas negative acceleration demands control the vehicle brake. The thresholds T1 and T2 may be made substantially equal to zero or may be made positive and negative, respectively, by predetermined amounts so as to provide a "dead band" between throttle control and brake control.

Similarly, the comparators 15 and 19 may be provided with hysteresis in order to prevent hunting or instability when the acceleration demand is close to the threshold T1 or the threshold T2. The gating arrangement ensures that control of vehicle drive and control of vehicle braking cannot occur simultaneously.

Figure 3:
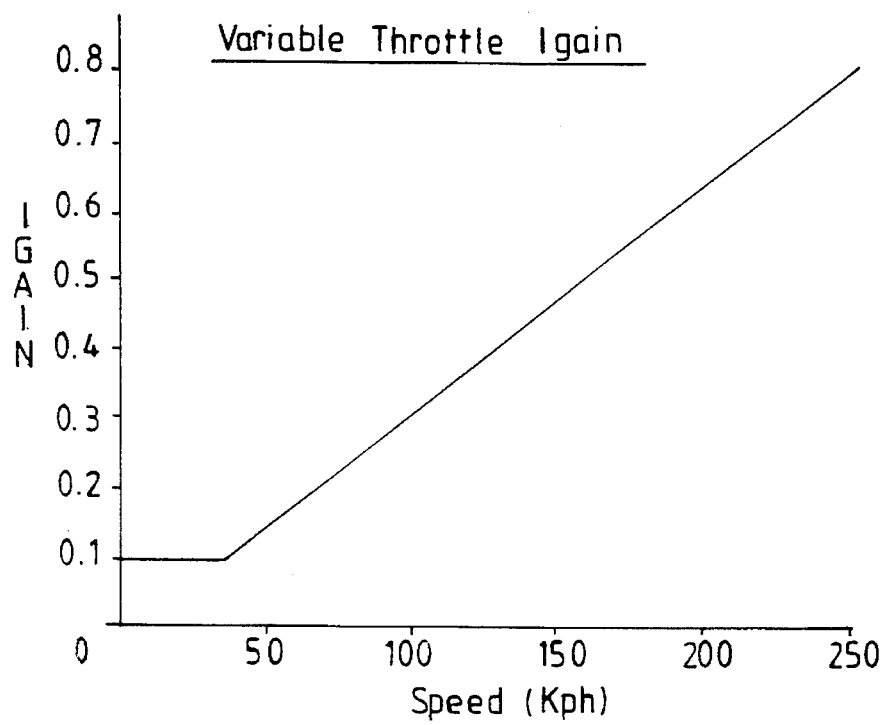
FIG. 3 is a graph of throttle integrator gain as a function of vehicle speed.

When the limited acceleration demand from the limiter 10 exceeds the threshold T1, the comparator 15 switches on the switch 11 and the acceleration error is multiplied by the integration gain from the circuit 14. The integration gain is a function of vehicle speed and may be stored as a look-up table in read only memory or calculated directly as a function of the vehicle speed. The function is illustrated in FIG. 3. For relatively low speeds, for instance below about 35 km/h, the integration gain has a value of 0.1. For higher vehicle speeds, the integration gain increases linearly with speed so as to have a value of approximately 0.8 for a vehicle speed of 250 km/h. Thus, by varying the integration gain with speed, the cruise control apparatus provides a smooth response at slow speed and a fast response at higher speeds.

The throttle actuator 16, as described hereinbefore, integrates the control signal from the multiplier 13. When not in cruise control, the integrator, which may be electronic or mechanical or any other suitable device, is pre-loaded with the current throttle position so that the throttle quickly assumes the desired position when cruise control is actuated.

When the acceleration demand is less than the threshold T2, the acceleration error is supplied via the switch 12 to the brake actuator 17 for controlling the vehicle brake. However, the switch 12 is switched off and braking inhibited when the vehicle under cruise control is too close to the lead vehicle as determined by the comparator 21 and the speed of the vehicle under cruise control is less than that of the lead vehicle as determined by the comparator 20. In these conditions, the vehicle brake is not applied but instead the vehicle is allowed to coast so that it achieves the desired range. This brake inhibiting arrangement is preferably only enabled during an initial phase of cruise control operation when the vehicle under cruise control is initially being controlled to the desired range and to a vehicle speed matching that of the lead vehicle. Once this has been achieved, the comparators 20 and 21 may be disabled so as to prevent inhibiting of the vehicle brake during subsequent cruise control operation.

By effectively controlling the acceleration of a vehicle in accordance with errors in the range and relative speeds, it has been found possible to provide a cruise control apparatus which has stable operation and avoids hunting or oscillation about the desired range. By matching the speed of the vehicle under cruise control to that of the lead vehicle and maintaining a desired range from the lead vehicle, driver intervention during cruise control operation is reduced and, in many circumstances, eliminated until the driver wishes to disable cruise control operation. The apparatus shown in FIG. 1 thus provides automatic intelligent cruise control operation of a vehicle with minimal driver intervention when following a lead vehicle. If desired, the cruise control apparatus may be switchable by the driver from the operation described hereinbefore to conventional cruise control operation, wherein the vehicle is controlled to achieve a driver-selected target speed, when the vehicle is not following a lead vehicle.

We claim:

1. A cruise control apparatus for a vehicle, comprising a distant error calculator for determining a distance error as a difference between a desired distance between a target and the vehicle and an distance between the target and the vehicle, a speed error calculator for determining a speed error as a difference between a speed of the target and a speed of the vehicle, an acceleration demand calculator responsive to the distance error calculator and the speed error calculator, for producing a vehicle acceleration demand as a function of the distance error and the speed error, and an acceleration error calculator for producing an acceleration error as a difference between said acceleration demand and an actual vehicle acceleration.

2. A cruise control apparatus as claimed in claim 1, in which said acceleration demand calculator is arranged to calculate the vehicle acceleration demand as the sum of a product of the distance error and a first gain and a product of the speed error and a second gain.

3. A cruise control apparatus as claimed in claim 1, further comprising desired distance determining means for determining the desired distance as a function of vehicle speed.

4. A cruise control apparatus as claimed in claim 2, further comprising gain setting means for setting at least one of said first and second gains such that a quotient of said first gain divided by said second gain is a function of at least one of the distance and the distance error.

5. A cruise control apparatus as claimed in claim 4, in which said gain setting means is arranged to set said quotient to a first value for one of a first distance error and a first actual distance, and to a second value less than said first value for one of a second distance error and a second distance greater than said one of the first distance error and the first distance.

6. A cruise control apparatus as claimed in claim 5, in which said gain setting means is arranged to set said quotient as a monotonically decreasing function of one of the distance error between said first and second distance errors and the actual distance between said first and second distances.

7. A cruise control apparatus as claimed in claim 4, in which said gain setting means is arranged to substantially halve a value of said quotient when the distance error is greater than a first predetermined distance error which is greater than zero and the speed error is greater than a first predetermined speed error which is greater than zero.

8. A cruise control apparatus as claimed in claim 1, in which said vehicle has a drive system and a brake system, said cruise control apparatus further comprising a gating arrangement for supplying said acceleration error to said drive system when one of said acceleration error and said acceleration demand is greater than a first threshold which is greater than zero, and for supplying said acceleration error to said brake system when one of said acceleration error and said acceleration demand is less than a second threshold which is less than zero.

9. A cruise control apparatus as claimed in claim 8, further comprising an inhibitor for inhibiting the supply of said acceleration error signal to said brake system when one of said acceleration error and said acceleration demand is greater than said second threshold, the distance error is greater than a second predetermined distance error which is less than zero, and the speed error is greater than a second predetermined speed error which is less than zero.

10. A cruise control apparatus as claimed in claim 1 use in a vehicle driven by an internal combustion engine having a throttle controlled in a cruise mode by an integrating controller, said cruise control apparatus further comprising further gain setting means for multiplying said acceleration error by a third gain which is a function of vehicle speed.

11. A cruise controller as claimed in claim 10, in which said third gain has a constant value below a predetermined vehicle speed and a value which increases monotonically with vehicle speed above the predetermined vehicle speed.

12. A cruise control apparatus as claimed in claim 1, further comprising a limiter for limiting said acceleration demand to less than a first positive demand threshold and greater than a negative demand threshold.

13. A cruise control apparatus as claimed in claim 2 in which said second gain is a constant.

14. A cruise control apparatus as claimed in claim 13, in which said second gain has a value of one.

15. A cruise control apparatus as claimed in claim 1, further comprising a radar system for measuring the distance to and a relative speed of the target.

16. A method of cruise control for a vehicle, comprising determining a distance error as a difference between a desired distance between a target and the vehicle and the actual distance between the target and the vehicle, determining a speed error as a difference between a speed of the target and a speed of the vehicle, forming a vehicle acceleration demand as a function of the distance error and the speed error, and controlling the vehicle in accordance with an acceleration error formed as a difference between said acceleration demand and an actual vehicle acceleration.

17. A method of cruise control as claimed in claim 16, in which said vehicle acceleration demand is formed as a sum of a product of the distance error and a first gain and a product of the speed error and a second gain.

* * * * *